June 23, 1953  A. L. W. WILLIAMS  2,643,071
MAGNETIC TRANSDUCING APPARATUS
Filed March 7, 1947  7 Sheets-Sheet 1
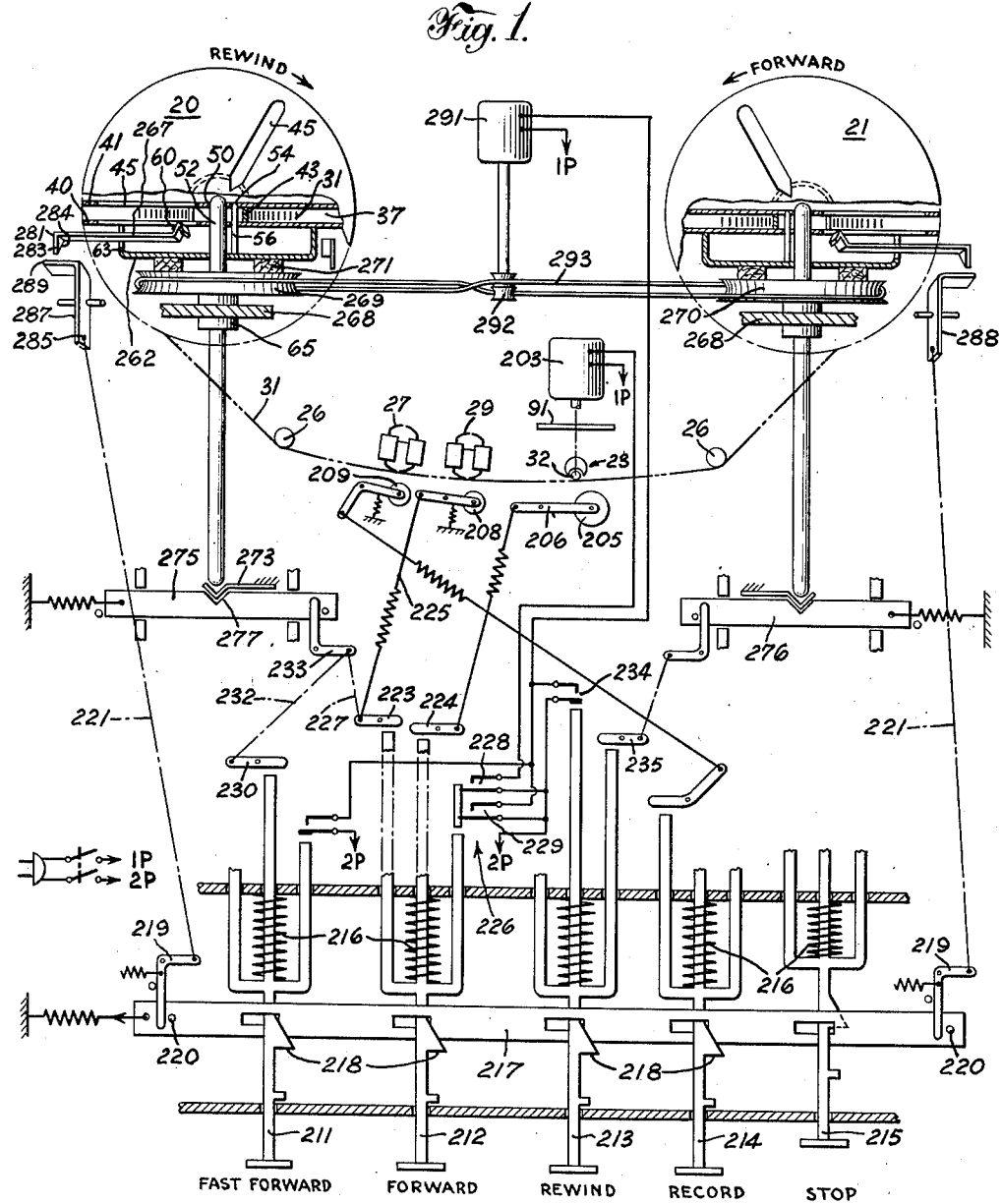
Fig. 1.
INVENTOR
A.L.W. WILLIAMS
BY 
ATTORNEY

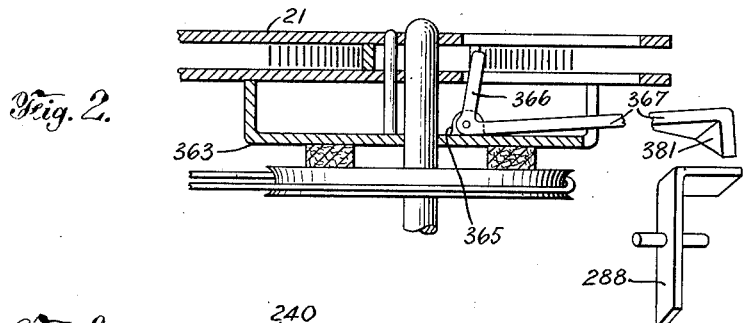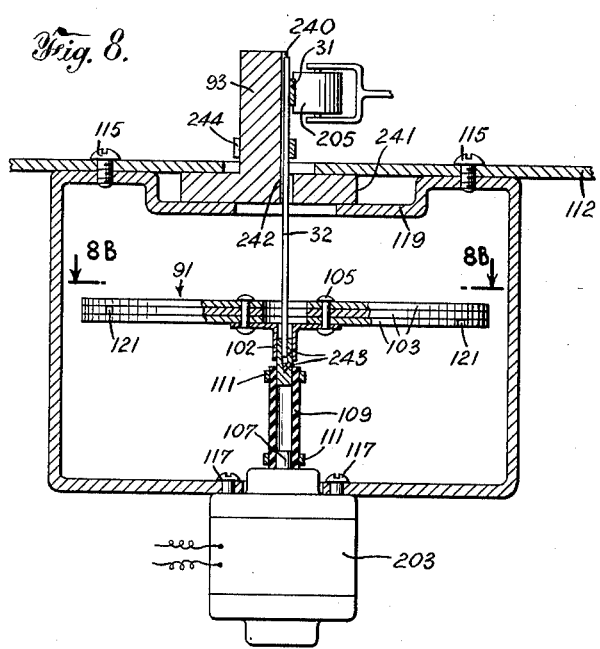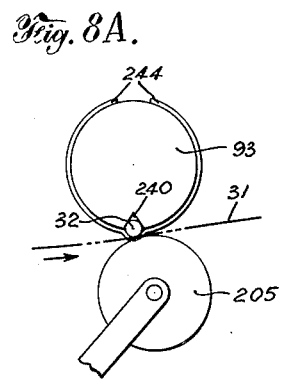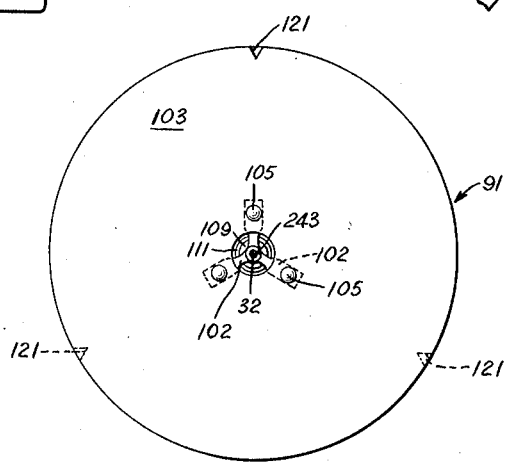

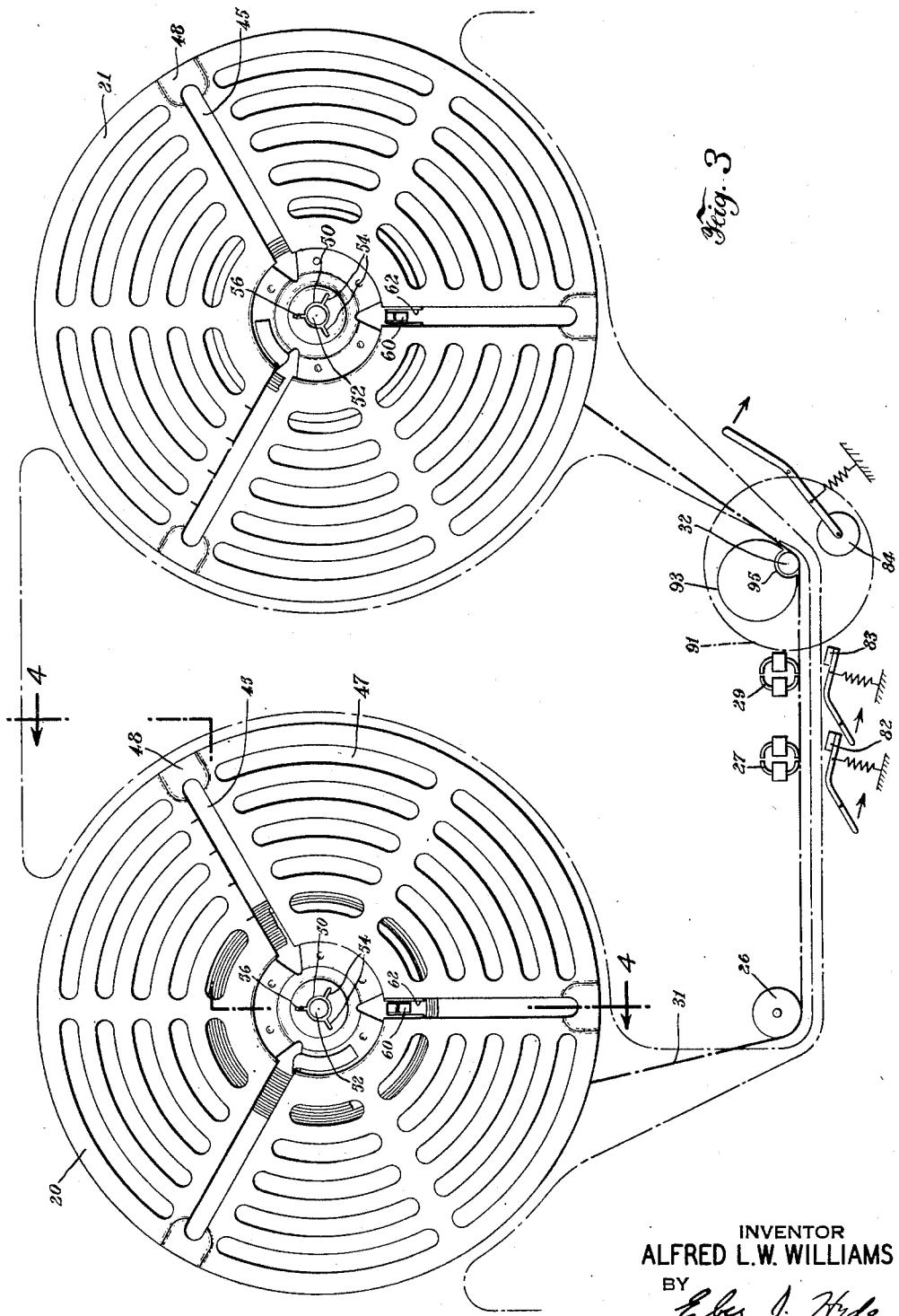

June 23, 1953    A. L. W. WILLIAMS    2,643,071
MAGNETIC TRANSDUCING APPARATUS
Filed March 7, 1947    7 Sheets-Sheet 4

INVENTOR
ALFRED L. W. WILLIAMS
BY Eber J. Hyde
ATTORNEY

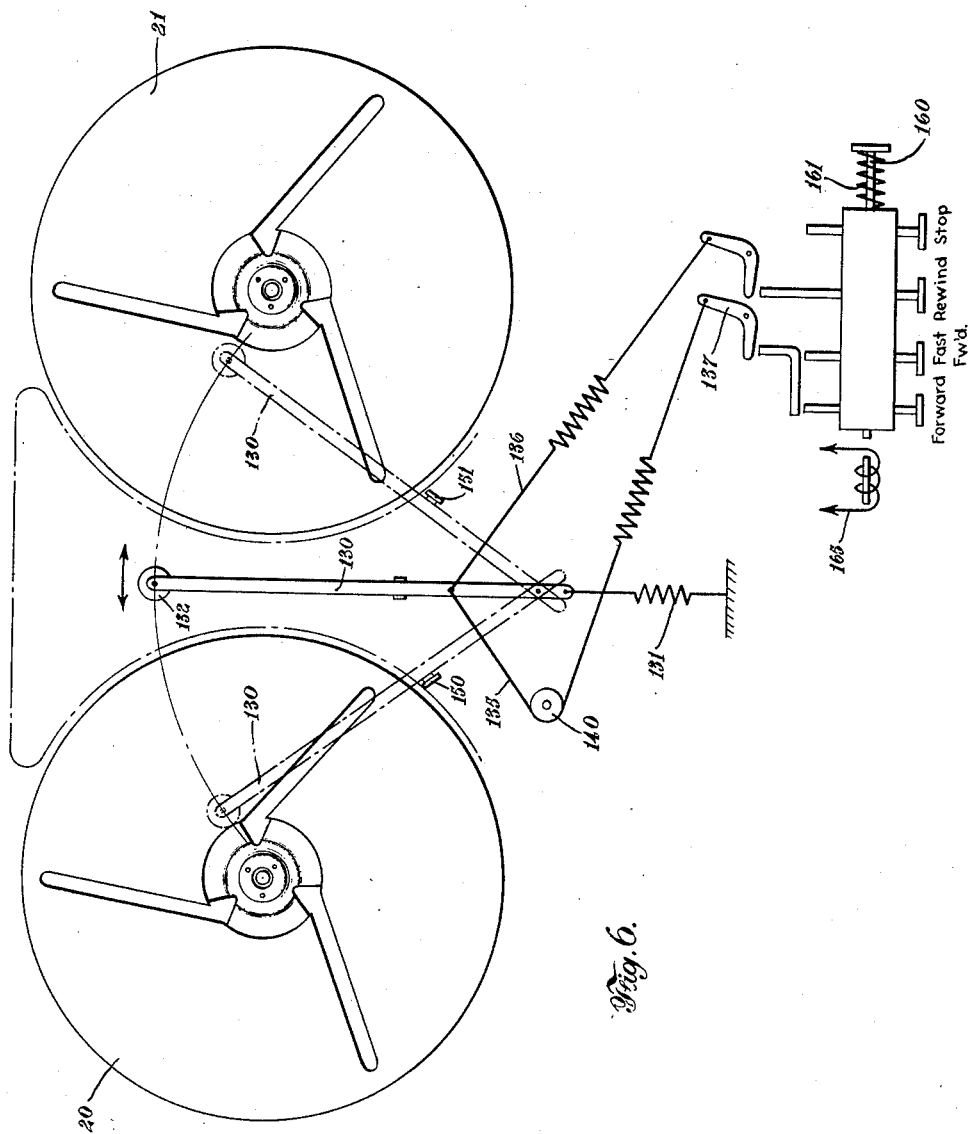

June 23, 1953 A. L. W. WILLIAMS 2,643,071
MAGNETIC TRANSDUCING APPARATUS
Filed March 7, 1947 7 Sheets-Sheet 6
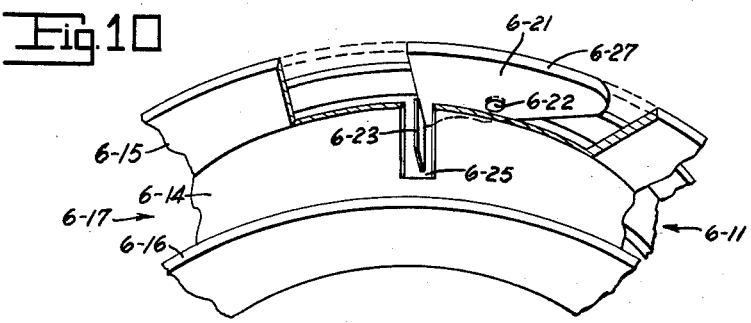
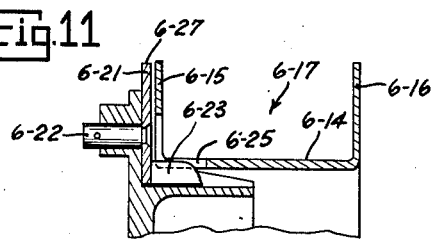
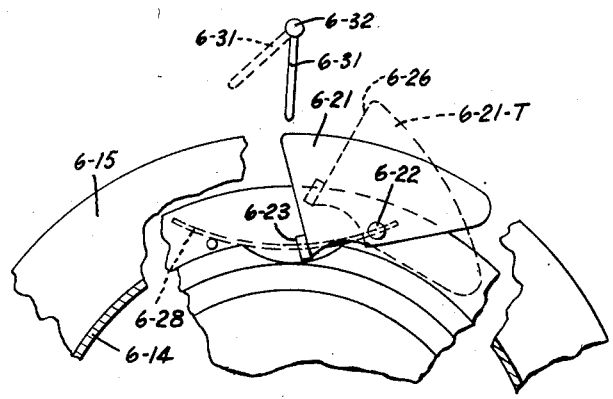
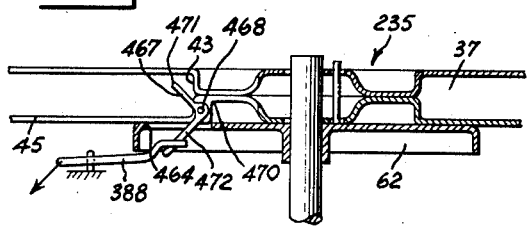
INVENTOR.
A.L.W. WILLIAMS
BY
ATTORNEY

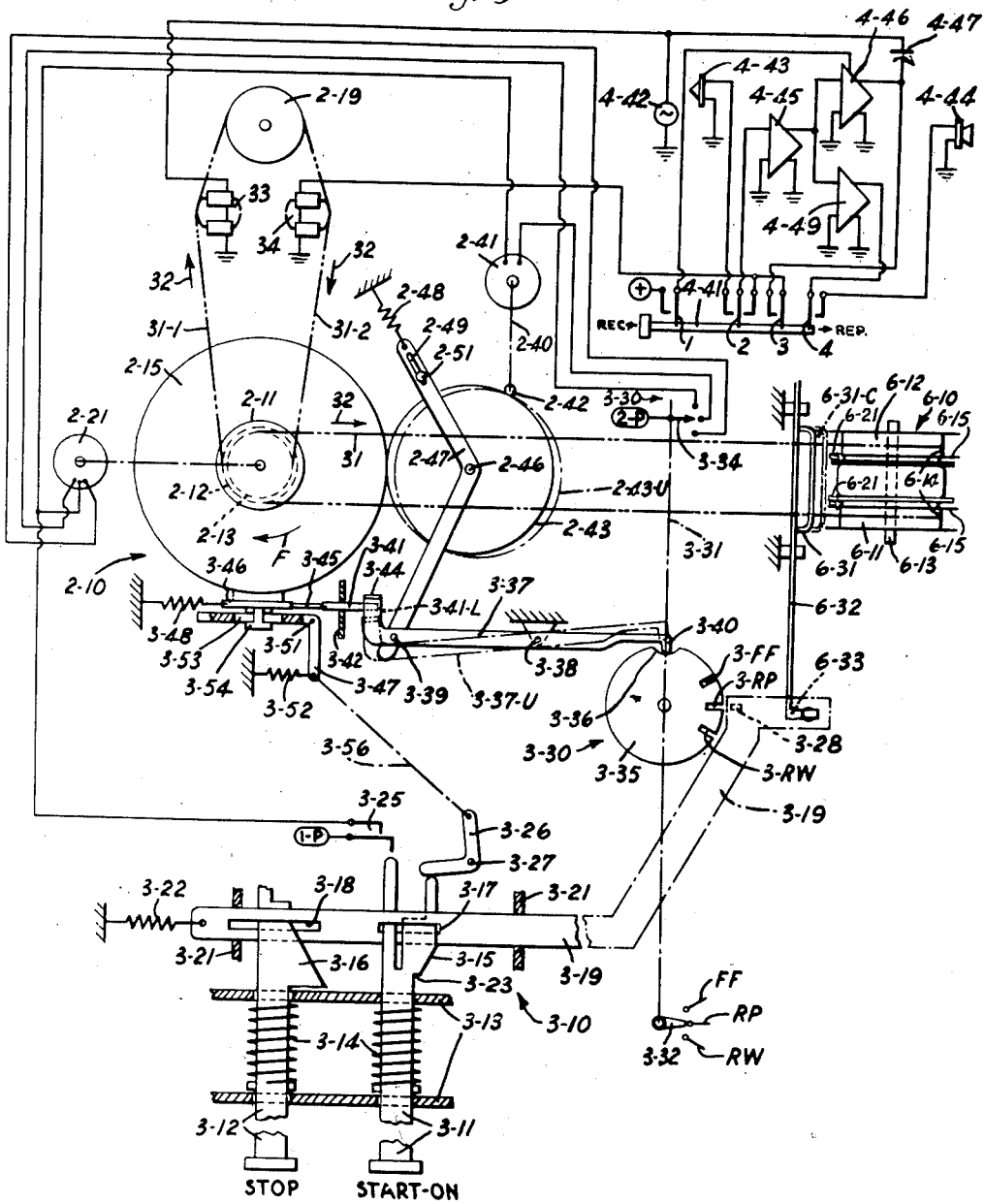

Patented June 23, 1953

2,643,071

UNITED STATES PATENT OFFICE 2,643,071

MAGNETIC TRANSDUCING APPARATUS

Alfred L. W. Williams, Cleveland Heights, Ohio, assignor to The Brush Development Company, Cleveland, Ohio, a corporation of Ohio Application March 7, 1947, Serial No. 732,970

4 Claims. (Cl. 242—57)

This invention relates to magnetic transducing apparatus and specifically that type of magnetic transducing apparatus in which an elongated magnetic record track is moved from one record track holder to another past a magnetic transducing core.

Among the objects of the invention is novel record track impelling arrangements for moving the record track from one holder to another and having provisions for interrupting the impelling when a desired amount of the record track has been moved.

The foregoing and other objects of the invention will be best understood from the following description of exemplifications thereof, reference being had to the accompanying drawings wherein:

Fig. 1 is a diagrammatic illustration with parts broken away and in section of one form of magnetic transducing apparatus according to the invention;

Fig. 2 is a partial view showing a modification of the apparatus shown in Fig. 1;

Fig. 3 is a plan view of a different form of transducing apparatus embodying the invention;

Fig. 6 is a view similar to Fig. 3 of a still further form of the invention;

Fig. 7 illustrates a still further modification of the reel limit control.

Fig. 8 is an enlarged detail view of a novel constant speed record track feed arrangement of the invention;

Fig. 8A is a top view of the construction of Fig. 8.

Fig. 8B is a sectional view of Fig. 8 along the lines 8B—8B;

Fig. 9 is a diagrammatic representation of an additional form of transducing apparatus embodying the invention;

Fig. 10 is a perspective view from below of a portion of a record track reel construction embodying the invention;

Fig. 11 is a longitudinal sectional view of a reel construction taken through the limit finger of Fig. 10; and Fig. 12 is a transverse section, looking up from below, of the limit trip arrangement shown in Fig. 9.

Figure 4:
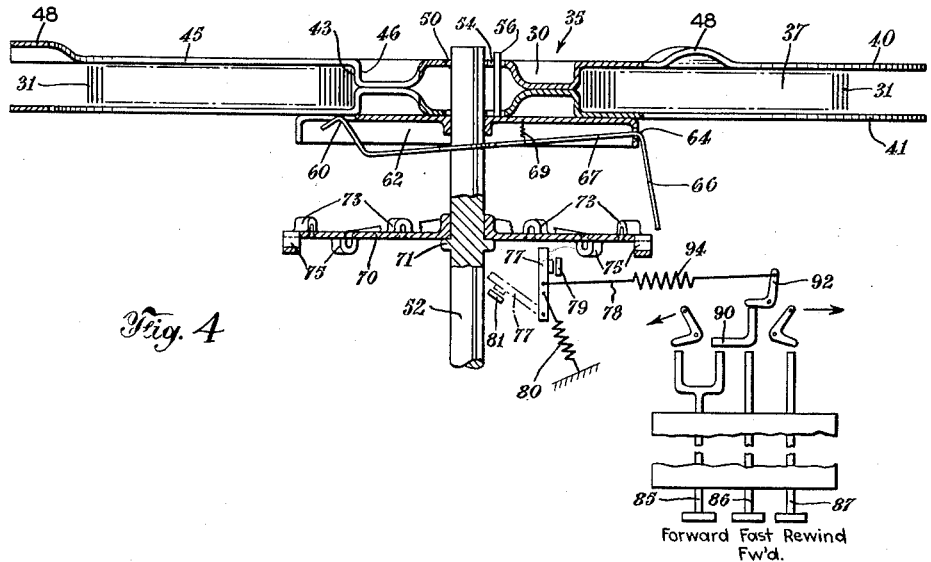
Fig. 4 is a sectional view taken along the line 4—4 of Fig. 2.

In transducing operations involving the impelling of an elongated magnetic record track from one holder or reel from which it is unwound to another holder on which it is wound, it is usually advisable to have an automatic limit switch present to terminate the impelling of the record track when a desired amount has been removed from the holder from which it is being unwound. Such limit switches, as they are sometimes called, may be provided in the guide path along which the record track moves between the holders but this complicates the reeling inasmuch as it requires a special threading operation to dispose the record track along the guide path so that it will produce the proper operation of the limit switch. Also an extra surface engaging the moving record track adds to its frictional wear and hastens the ultimate destruction. Furthermore the record tracks are usually thin and fragile so that these limit switches must be carefully made to be highly sensitive to slight control forces.

Another disadvantage of the guide path limit switch is that in the absence of complicated modifications it only responds to the complete reeling through of the record track.

According to the invention record track reeling may be effected with limit switches provided in such a manner that they require no special threading step, do not appreciably increase the abrasion of the record track, need not be very delicate and may be operated to terminate the reeling before all the record track is removed from the holder from which it is being unreeled. This early termination of the reeling enables the record track to be quickly and easily rewound without an extra operation for anchoring the end of the completely unwound record track back on the reel from which it was unwound.

Fig. 1 illustrates one form of the invention in which a record track 31 which may be in the form of a tape is led from a supply reel 20 over guides 26, 26, a magnetic erasing core 27, a magnetic recording-reproducing core 29, a capstan 32 and on to a take-up reel 21.

The reels 20 and 21 may be identical, having a central hub portion 35 around which there is an annular record track receiving region 37 bounded by two side walls or flanges 40 and 41 and a floor 43, as more clearly shown in the sectional representations. The record track may be held in coiled form in the record track receiving space of each reel. Forward reeling of the record track is shown as effected by rotation of the take-up reel 21 in the counterclockwise direction as indicated by the "Forward" arrow. The record track is thereby wound up on the reel 21 as it unwinds from reel 20. The record track may similarly be rewound back onto the reel 20 by rotating this reel in a clockwise direction as indicated by the "Rewind" arrow. The reel flanges 40, 41 may be provided with slots 45 extending radially from adjacent the reel periphery into the hub 35 through perforations in the floor 43.

In the central portion of the reel there is provided an aperture 50 for receiving a reel shaft 52 on which the reel is rotatably mounted. The reel may have one or more additional apertures 54 for receiving a drive pin 56 to effect its rotation. The radial slots 45 are useful for assisting in the anchoring to the reel of one end of the record track.

This feature is not a part of the present invention being described and claimed in the copending Murphy application Serial No. 741,620, filed April 15, 1947.

The space between the flanges 40 and 41 may be quite small, of the order of a quarter inch when used with a record tape wide enough to give excellent reproduction. The inner portions of the slots 45 may also be used for admitting the sensing finger 60 of a limit switch assembly.

The reels are shown as supported on a holder collar 262 secured to shaft 52 and in the form of plate having an upwardly dished periphery 63 on which the reels are supported.

The shafts 52 are shown as longitudinally slidable in bearings 65 which may be held on a suitable support such as the stationary plate 268. Drive pulleys 269, 270 may be rotatably and non-slidably mounted on the bearings and may be provided with friction rings 271 so that by longitudinally sliding the shafts 52 down and up the collars 262 may be frictionally engaged with and disengaged from the drive pulleys. The friction rings may merely be made of felt or rubber.

Below the lower ends of each shaft 52 is mounted a spring socket 273 suitably secured over a slide 275, 276 provided with a notch 277 for receiving the spring socket. The slide 275 moving between the guides shown is arranged to permit the downwardly biased spring socket to be received in the notch and disengage the shaft or to be cammed upwardly by the upper surface of the slide to move the shaft 52 upwardly.

The shaft 52 is biased downwardly as, for example, by the weight of the associated members so that it is either holding the collar 262 in frictional engagement with the drive pulley or it is held up by the upwardly cammed socket 273 and keeps the collar disengaged from the pulley.

The sensing finger 60 may be shaped as shown and be of a size suitable for passage through the slots 45 and engagement with the central turns of record track on the reels. The finger is shown as one end of a limit lever 267 pivotally held on the wall 63 of the collar 262 and biased as by its own weight distribution so as to urge the sensing finger upwardly. A very small amount of upward biasing force is all that is needed especially if the record track is of the type having a paper or plastic base and a bonded stratum of permanently magnetizable particles as disclosed in the Kornei applications, Serial Nos. 685,092, 685,093, filed July 20, 1946. The latter application has been abandoned.

The outer end of the limit lever 267 is shown as provided with a depending lip 281 having a sloping lower edge 284 to produce a generally vertical depending surface 283. Below the lip 281 is pivotally mounted as at 282 a limit trip member 287, 288 provided with a horizontally extending arm 289. The arm 287 and lip 281 are so disposed that the tilting of the limit lever 267 in response to the upward travel of the sensing finger, causes the lip to descend to the level of the arm. Rotation of the collar and reel 20 in the forward reeling direction (counterclockwise as seen in the figure) will, with the lip tilted downwardly, cause the vertical face 283 of the lip to engage and move the arm 289 around its pivot 285. Rotation of the roller and reel 20 in the rewinding direction will, with the lip tilted downwardly, permit the lower sloping surface of the lip to act as a cam engaging and riding over the arm 289 without pivoting the limit trip.

The corresponding limit control members associated with the take-up reel 21 operate in a similar manner except that the flat face 283 of the lip 281 of this assembly is arranged to operate the trip lever 288 only when the reel 21 is rotating in the rewinding direction.

Rotation of the shafts 52 is shown as controlled by a motor 291 connected to rotate a drive pulley 292 held in engagement with a crossover belt 293 looped around the pulleys 269, 270 so as to rotate the pulleys in opposite directions.

Movement of the record track along the guide path defined by the magnetic cores and the capstan is under the control of the constant speed capstan when the record track is moving forward in a transducing operation.

The capstan assembly is shown as including a constant speed motor 203 connected to rotate a thin capstan shaft 204 carrying a fly wheel 205. The record track is held against the capstan shaft 204 by a pressing member such as the roller 205 mounted on an arm 206 movable into and from an operated position in which it urges the pressing roller toward the capstan shaft. The arm may be biased to the retracted position illustrated and connected for automatic operation by reel control apparatus as described below. Similar pressing members 207, 208 may be employed for holding the record track in stable and uniform magnetic contact with the respective magnetic cores.

The reel control apparatus illustrated includes assembly of push rods 211, 212, 213, 214 and 215 held between guides so as to permit the longitudinal movement of each rod between an inner operated position in which the "Stop" push rod 215 is shown, and an outer retracted position in which the other push rods are shown and towards which they are all biased, as by the springs 216. A biased latch plate 217 is also slidably mounted and provided with slots for receiving the push rods, the wall of the slots coacting with latch cams 218 on the push rods to hold inwardly operated rods in their operated position. Sliding of the latch plate against the urging of its bias will operate to unlatch the cams 218 and permit retraction of any inwardly latched rods by the springs 216. Sliding and unlatching of the latch plate may be effected through the cams 218 by inwardly operating any of the push rods or by the limit trip members 287, 288 through the levers 219 coacting with projections 220 on the latch plate and connected as by links 221 for operation by the trip members 287, 288.

Inward operation of the respective push rods establish suitable transducing and reeling operations as indicated by the rods which are labelled "Fast forward," "Forward," "Rewind," "Record" and "Stop" respectively. Linkages and switches are shown as positioned for actuation by extensions of the rods to accomplish the various reeling and transducing controls.

Forward reeling of the record track as in a transducing operation may be obtained by inwardly operating "Forward" push rod 212. As shown this operates the transducing control lever 223, the capstan pressing control lever 224 and the switch group 226. Actuation of the transducing control lever 223 moves the slide 275 to the right by means of the linkage 227 and the pivoted slide lever 233 causing the supply reel shaft socket 273 to be raised and lift the supply reel shaft 52 and collar 262 out of engagement with the pulley 269. The take-up reel collar remains engaged with its pulley 270, as shown. The transducing control lever 223 and 150 through linkage 225 moves the transducing head pressing member 208 toward the transducing head 29.

Actuation of the capstan control lever 224 moves the capstan pressing member 205 toward the capstan shaft 204 to firmly hold record track against the capstan shaft.

Actuation of the switch group 226 establishes power supply circuits for the motors 291 and 203 from a power supply having two conductors connected by means not shown to the leads 1P and 2P respectively. The switch group includes two switches 228 and 229, the first completing the power supply circuit to the capstan motor 203 and the second supplying power to the reel motor 291.

It is apparent therefore that inwardly actuated "Forward" push rod 212 establishes a constant speed reeling of the record track by the capstan as well as a take-up of the record track fed by the capstan on take-up reel 21. The motors 291 and 203 may be of a suitable low power such as constant speed induction motors similar to those used in phonograph turntables. The torque of reel motor 291 acting through the large radius of the windings on the take-up reel should be insufficient to supervene over the record track impelling by the capstan motor, and need only be large enough to take up the record track as it is fed by the capstan.

Operation of the "Fast forward" push rod 211 to its inward position closes switch 231 and rotates clutch lever 230. The switch 231 supplies power to the reeling motor and the clutch lever 230 through its link 232 actuates the slide 275 so as to disengage supply reel 20 from its pulley 269. The pressing members 205, 207 and 208 remain retracted as long as the "Forward" push rod 212 is retracted. The link 227 may be limp so that it operates only when under tension and the rotation of slide lever 233 to disengage the clutch will not cause operation of lever 223, although either link 227 or link 232 may rotate the slide lever 233. The "Fast forward" push rod 211 accordingly produces a forward reeling of the record track which is not slowed by engagement with the capstan or the magnetic cores and is therefore at a speed much closer to the maximum speed at which the reeling motor 291 can form the take-up reel. This high speed reeling may be as high as thirty or more times as fast as the slow forward impelling by the capstan.

Inward actuation of the "Rewind" push rod 213 closes switch 234 and rotates clutch lever 235. Switch 234 establishes a power feed to the reeling motor 291 and clutch lever 235 disengages the take-up reel clutch so that the record track is rapidly rewound from the take-up reel to the supply reel at a speed which may be arranged to be as high or higher than the fast forward reeling speed.

The "Record" push rod is shown as connected for actuating the erasing core pressing member 207 and may also be arranged as by switches not shown to establish recording circuit connections from the magnetic cores to suitable amplifying apparatus and sound transducers. When in the retracted position the "Record" push rod 214 may establish playback circuits. The pressing action of the pressing members 207, 208 and 205 should be adjusted so that the added friction against the erasing head during recording does not significantly affect the transducing speed of the record track. If desired, however, pressing members 207 and 208 may be interconnected for simultaneous actuation by the transducing control lever 223. The specific arrangement for switching the recording and playback circuits forms no part of the present invention and any switch construction may be used as for example that shown in the Jones application Ser. No. 728,786, filed February 15, 1947, now abandoned, or in the Dank application Serial No. 690,878, filed August 16, 1946, now Patent No. 2,535,486, issued on December 26, 1950.

The "Stop" push rod 215 need only be mounted as an unlatching means to cause retraction of inwardly latched operating push rods. Such retraction automatically terminates any reeling or transducing operation. If desired, however, the "Stop" push rod 215 may be equipped with switches to control the power supply to any or all of the various components including the oscillator or amplifiers.

A feature of the present invention is the limit control operation for automatically terminating a reeling operation when it has arrived at a predeterminal stage. The limit controls are not in the form of reeling guide means around which the record track must be threaded before reeling is commenced and so avoids some of the complications of such prior art systems.

According to the invention the limit control structure is arranged for automatic coaction with the record track on the reels without requiring any special manipulation of the record track, reels or any other portions of the apparatus. A reel of record track is merely placed on its proper holder, the record track threaded through a simple guide path having no maze-like convolutions and anchored on a reel on the opposite holder. Reeling may then be effected by simple operation of the suitable controls.

In forward reeling at low or high speed from a supply reel to a take-up reel, the mounting of the supply reel containing record track on the supply reel collar 262 causes the inner turns of record track on the reel to engage and tilt downwardly the sensing finger 60 of the limit lever 267 so that the outer end 283 of this lever is raised above the level of the arm 289. The limit lever 267 is so positioned with respect to the drive pin 56 and the drive pin sockets in the reels that when a reel is properly mounted in driving engagement on its collar, the inner end of one of the slots 45 is positioned so as to permit engagement between the upwardly biased sensing finger and the record track on the reel. When so much of the record track is unreeled that the turns holding the sensing finger down are removed, the sensing finger moves up tilting the limit lever so that the face 283 descends to the level of the arm 289. Due to the forward reeling the collar 262 is carrying the lever 267 around in counter-clockwise rotation (as seen in the figure) so that the moving face 283 strikes the arm 289 causing the trip member 287 to rotate around its pivot 285 and by means of the link 22 to rotate the latch lever 219 which engages the pin 220 to move the latch plate 217 against its bias and into unlatching position. As a result, any inwardly latched push rods are returned from inwardly latched operating position, automatically stopping the reeling.

The clutch arrangement may be adjusted so that engagement of the clutch is not accompanied by a downward movement of the limit lever support sufficient by itself to lower the outer end 283 of the lever to the level of the arm 289. Such adjustment will avoid difficulties by engagement of the drive clutch while the reel is rotating in the unwind direction as where the "Rewind" push rod is actuated before the forward reeling has stopped. Such operation of the controls causes the "Forward" push rod to be unlatched and retracted by its spring 216 permitting the slide 275 to be returned to the clutch-engaging position illustrated.

According to the invention, the limit control for either reel is arranged to be non-responsive to reeling in the direction that winds record track on that reel. As shown the lips 281 of the limit levers may have their lower edges tapered as at 284 so that the commencement of rotation of the supply reel 20 in the rewind direction, for example, will, when insufficient record track is present to lower the sensing finger, merely cause the lip to cam itself up over the trip arm 289 without moving the arm. Also the link 221 may be arranged for transmitting tensile forces only so that even if the trip lever 287 is pivoted in the undesired direction, no unlatching of the latch plate 217 occurs.

As shown in Fig. 1, the limit control structures on the take-up reel mounting may be substantially the same as that on the supply reel, being arranged for response to unreeling of the record track in the "Rewind" direction only.

The sensing members 60 may be so positioned along a radius of the reels that it responds to the unreeling of any desired portion of the reeled record track. For example, the supply reel sensing member may respond to the unreeling of those record track turns some distance from the inner end so that the limit assembly stops forward reeling before the record track is completely unreeled. This feature enables the rewinding to be simply effected after the end of a forward reeling without requiring a special operation to anchor the end of the record track back on the supply reel.

The rewinding need not be arranged to terminate with the record track still anchored to the take-up reel since in most instances the rewinding is not followed by a re-transducing of the same reel. The higher rewind speed, however, permits a take-up sensing finger location similar to that shown above for the supply reel and makes such arrangement suitable for the application of reel-braking forces before the completion of the entire rewinding, as by the movement of the take-up clutch slide 276 under the actuation of the tripped limit control lever 288. The rapidly rotating take-up collar 262 is accordingly urged into frictional engagement with the oppositely rotating friction pad 271, slowing the rewinding and diminishing the tendency for the free end of the rewound tape to flap around at high speed and become damaged after disengagement from the take-up reel.

According to another phase of the invention, the limit controls may be arranged, at least for the take-up reel, to respond to the complete unreeling of the record track.

Fig. 2 illustrates such a construction in which the collar 363 receiving the take-up reel 21 is provided with a limit lever 367 pivotally mounted as at 365 and having an upstanding finger 366 arranged to penetrate a reel placed on the collar and engage the inner turn of record track wound on the reel. The finger 366 may be outwardly biased as by the weight distribution of the lever 367 and/or by the centrifugal force developed during the unreeling. The outer end of the lever 367 may be provided with a depending lip 381 similar to the lips 281 described in connection with Fig. 1 and may be similarly arranged for actuating the limit trip member 288.

Figure 5:
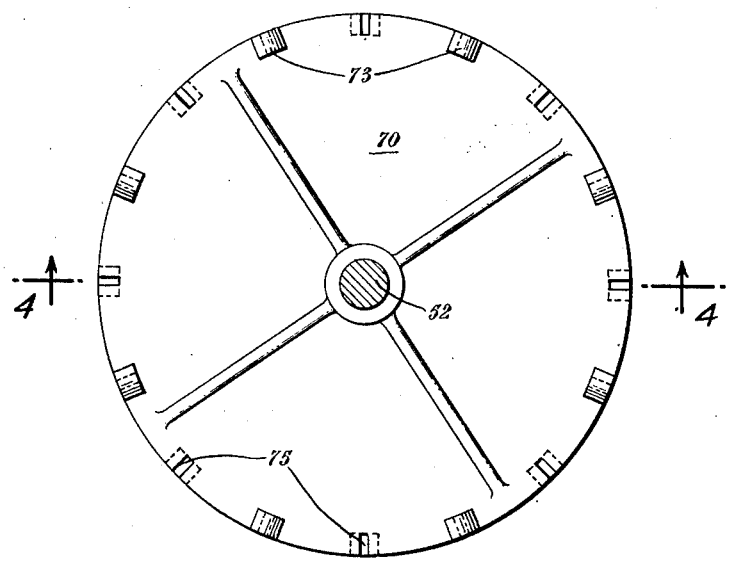
Fig. 5 is a view taken along the line 5—5 of Fig. 4.

Referring to the construction of Figs. 3, 4 and 5, there is here shown a form of the invention having a different limit control arrangement. The reels are shown as provided with arcuate slots 47 in addition to the radial slots 45 for diminishing their weight as well as improving the visibility of the record track wound on them. The space between the flanges of the reels is too narrow to admit the operator's fingers and flares are shown at 48 adjacent the outer end of the radial slots to enable easier attachment of the record track to the reel.

The drive shafts 52, each of which may be driven by an independent motor are provided with a table 62 upon which the reel rests when mounted, and to which the driving pin 56 may be secured. The shaft 52 may project below the table 62 and may be rotatably mounted and connected to an impelling means, such as a motor not shown.

Affixed to the peripheral region of the table 62 is a pivotal switch lever 66 having an arm 67 carrying the sensing finger 60 and biased upwardly as by the spring 69. The lever may merely be of sheet metal construction. It may have a distribution of weights to assist or substitute for the spring 69. The weight distribution may be such that centrifugal force will increase the biasing force.

Below the switch lever 66 there is shown a switch ring 70 loosely mounted around the shaft 52 on a collar 71. The ring 70 is more clearly shown in Fig. 5 and contains around its periphery a multiplicity of upwardly and downwardly directed projections or corrugations 73 and 75 respectively. The ring 70 is so located that only the projections 73 extend above the level of the lower end of the lever 66. The projections, however, do not interfere with the rotation of the lever 66 with the turn table 62, unless the lever 66 is pivoted in a clockwise direction around the pivot 64. This clockwise pivoting is urged by the bias 69, but is prevented when the upward movement of the sensing finger is restrained by the presence of the record track in its path. The downwardly extending projections 75 co-act with a pivotally mounted switch actuating arm 77 arranged to operate the limit switch circuits when rotated around its pivot in counter-clockwise direction from the full line position shown to the dotted line position. An overcenter spring 80 may be used to accentuate the tripping action of the switch and a link 78 together with a stop 79 may be used for resetting the switch actuating arm 77.

Limit switch tripping results when the unreeling of the record track 31 from a reel goes so far as to expose a path for the upward movement of the sensing finger 60. Rotation of the lever 66 around its pivot 64 is thereby caused and in turn causes the lower end of lever 66 to engage an upper projection 73 and rotate the ring 70 under the influence of the rotation of table 62. Before ring 70 rotates very far a lower projection 75 trips the arm 77 and effects the operation of the limit switch circuits as by electrical contacts placed on the arm 77 and stop 79 with additional contacts on the stop 81 if desired.

The controls of the apparatus may be so adjusted that setting the apparatus for a forward reeling operation will cause the link 78 to be automatically moved to reset the arm 77 to the full line position under the supply reel limit switch members. The controls are shown in part as including switch rods 85, 86 and 87 to effect forward reeling at recording-reproducing speed, forward reeling at high speed and rewinding, respectively. The switch rods may be part of an interlocked push rod assembly as more completely disclosed in the copending Dank application Serial No. 690,878, filed August 16, 1946, now Patent No. 2,535,486, issued on December 26, 1950. Upon actuation of either the "Forward" rod 85 or "Fast forward" rod 86 is shown as moving the slide 90 and lever 92 to actuate the link 78 containing spring 94 although any other suitable arrangement may be used.

With the arm 77 in the tripped position shown in dotted lines, it is out of reach of the lower projections 75, so that the rotation of the ring 70 will not be interfered with, as for example, when the ring rotates in a direction opposite to the tripping direction and not enough record track is present on the reel to keep the sensing finger 60 down.

The sensing finger is so shaped and biased that it is readily expelled from the record track receiving space by the winding of the record track onto the reel without damage to the record track. Similarly, the continuation of unreeling after the sensing finger rises will permit the outward movement of record track past the finger. This outward movement will lower the finger, but will not reset the arm 77 from its tripped position. With the construction illustrated, however, not much unreeling will continue after tripping.

Pressing members 82, 83 and 84 are shown as mounted on arms for actuation by the "Forward" switch rod 80 into pressing relationship with the record track against the magnetic cores 27 and 29 and the capstan shaft 32. The switch rods may be arranged for also actuating the reeling operations and recording or reproducing as more completely shown in the above-mentioned Dank application.

During the transducing operations the feed reeling speed of the record track is maintained substantially constant by the frictional engagement with the capstan shaft 32 which may be driven by an induction type A. C. motor operated at the suitable speed to effect the desired rate of record track movement. The fixing of large diameter masses to the capstan shaft as indicated at 91 greatly increases the rotational inertia and constancy of rotation of the capstan shaft 32 which may have a very small diameter so as to enable direct connection to the impelling motor and direct frictional engagement with the record track. A support 93 is shown as assisting in the support of the thin rapidly rotating capstan shaft. A groove 95 is provided in the support 93 for receiving and closely engaging the capstan shaft and the support 93 may be effected as by making the support of a self-lubricating bearing composition such as graphite or briquetted powdered bronze and graphite impregnated with an oily lubricant and known as "Oilite." To avoid the contamination of the record track by lubricant the support 93 may be shaped so as not to contact the capstan shaft along those axial portions that are contacted by the record track. One form of capstan construction is more completely described in connection with Figs. 7 and 8.

A second limit switch assembly similar to the one described above, may be provided for the control of reeling operations in response to the amount of record track remaining on the take-up reel 21. The switch arm 77 of the take-up limit switch assembly may be linked with the switch rod 87, as indicated, so that the setting of the apparatus for a rewind operation will atuomatically set the rewind limit switch.

Fig. 6 illustrates another form of the invention in which the limit switch controls are of different construction. A single sensing arm 130 is here shown as pivotally mounted between the supply reel 20 and the take-up reel 21, so that by suitable pivoting the sensing arm may be caused to enter the record track receiving space of either reel. Restoring means such as the centering spring 131 may be used to return the sensing arm 130 to the netural center position shown in full lines, in which it is withdrawn from and does not interfere with the mounting or dismounting of the reels 20 and 21. An elastic link 135 is shown as connecting the sensing arm 130 around the roller 140 to an actuating lever 137 for causing the setting of the controls in a forward reeling condition to automatically set the sensing arm 130 into engagement with the record track wound on supply reel 120. A similar link 136 is shown as connected to cause the sensing arm 130 to engage the record track wound on take-up reel 21, when the controls are set for a rewindng operation. To reduce friction against the record track, the exploring end of the sensing arm may be provided with a roller 132 as shown.

Sensing arm stops 150 and 151 may be placed in the path of the sensing arm and may also be provided with a switching arrangement for terminating a reeling operation when a predetermined amount of record track remains on the reeling from which it is being unwound, and the sensing arm 130 has moved a corresponding distance along its path of travel.

A suitable arrangement will stop the forward reeling before all the record track is unwound and detached from the supply reel, while the rewinding is stopped when all the record track is unwound from the take-up reel. In this manner the rewinding of a transduced record track may be effected without performing an additional anchoring operation, and the rewound record track may be removed from the apparatus without requiring any hand rewinding. Since the rewinding and fast forward reeling operations are high-speed reeling operations, the inertia of the reels must be taken into consideration for the adjustment of the sensing arm position to which the limit switches respond.

The control rods shown in Fig. 6 may be arranged as part of an interlocked assembly of control rods, as shown in Fig. 1, in which a slidable latch plate 160 is biased as by spring 161 to latch the control rods in an inward actuated position. The switches provided with stops 150 and 151 may be connected so as to cause actuation of a solenoid 165 for movement of the latch plate 160 to an unlatched position, in which the control rods are released, thus terminating the reeling operation. In addition, the limit switches may also be connected so as to perform all the other necessary switching operations disclosed in the above mentioned Dank application, which is hereby made a part hereof.

The limit switches may be arranged to stop the reeling in any other manner. For example, the switch means associated with forward reeling stop 150 may be connected to cause actuation of the rewind control rod so that the rewinding will automatically take place when the forward reeling is completed. The limit switches may merely be mechanically acting, as for example, by arranging the stops 150 and 151 as latch members holding biased stop levers which may be latched by control rod operation and unlatched by contact with sensing arm 130. The stop levers may be connected to directly move latch plate 160 to the unlatched position as well as operate the other electrical switching necessary.

According to another modification of the invention, the sensing member may be mounted directly on the record track reel. Fig. 7 illustrates such a modification in which a reel 235 generally similar to the reel 35 shown in Fig. 4, has a sensing lever 467 held adjacent a slot 43 in the floor of the record track receiving space 37. In the form shown the sensing lever 467 is pivotally held as indicated at 468 on a portion of the reel hub such as the wall 470 which may be formed by bending inwardly some of the metal that is otherwise cut away to form the slot 43.

The lever 467 is shown as including an upper arm 471 and a lower arm 472, the lower arm being so arranged as to project downwardly below the lower face of the reel when the upper arm 471 is permitted to move outwardly as when not restrained by record track forms wound around the hub of the reel.

The reel support 62 is shown as provided with a passageway 464 for permitting downward movement of the arm 472 to a level at which it will during rotation engage and trip the limit lever 388 which may be arranged for operation in a manner similar to that shown for the limit lever of the arrangement of Fig. 1.

As indicated the lower surface of the reel 235 may be provided with a slot 45 for receiving and holding the arm 472 in flush relation with the lower surface of the reel. The reel is also a threading slot similar to the corresponding slot of the reel shown in Figs. 1, 2, 3. If desired the sensing lever 467 may be provided with an extension arranged to be retracted to project above the upper surface of the reel when the lever is in the actuated position shown, so that the reel limit control may be used when the reel is inverted. As an alternative, the reel may be provided with two or more sensing levers 467, arranged so that at least one is suitable for downward control operation from one surface of the reel and at least one other for similar operation with the other surface of the reel.

Figs. 8, 8A and 8B illustrate in detail one form of capstan construction in accordance with the invention. The capstan shaft 32 is quite thin being of such thickness that when directly driven by the motor 203 it rotates at a speed suitable for directly engaging and driving the record track 31, thus avoiding all expensive and large carefully machined parts that would be necessary to reduce the capstan motor speed to drive capstan rollers of the sizes hitherto used. As an example, a capstan shaft about 0.075 inch in diameter may be used with a motor having a normal speed of about 1800 R. P. M.

To support the thin capstan shaft, the bearing member 93 is provided as a backing. A shallow groove 240 may be formed in the bearing member so as to properly support the shaft 32 and the groove may be arcuate or merely V-shaped. The bearing 93 may be made of any of the well-known self-lubricating compositions such as the Oilite material described above.

As shown in Figs. 8 and 8A the pressing roller 205 which may have a slightly resilient periphery, is arranged to contact the capstan shaft 32 along a region of its rotation ahead of the point at which the record track first contacts it. The record track is accordingly pulled partly around the shaft 32 before it is subjected to the pressing between the shaft and the roller.

In other words the pressing engagement between the roller 205 and the capstan shaft is at all times beyond the region at which the record track first contacts the shaft as the track moves along in forward direction. This feature assists in preventing riding of the record track up or down along the capstan shaft as it is impelled, due to improper alignment of the pressing surfaces. With some constructions this vertical riding or shifting characteristic of the record track feeding appears as an objectionable feature which causes the record track to move away from the impelled engagement with the roller 205, even though its alignment is carefully adjusted.

As shown, the bearing member 93 includes a flange 241 by which it may be held in place. The flange 241 may completely surround the shaft 32 and provide an encircling bearing region 242. To further assist in supporting the shaft 32, one or more retaining bands 244 may be clampingly disposed around the shaft and support. The shaft 32 may be driven by securing its lower end, as, for example, by a press fit to a coupling shaft 243 which may be quite short and may be placed close to the flange 241. The coupling shaft 243 is shown as also provided with ears 102 upon which are held as by rivets 105 a flywheel in the form of a multiplicity of discs 103.

The coupling shaft 243 may be coupled to the drive shaft 107 of the capstan motor 203 by a flexible coupling member shown in the form of a short length of rubber tubing 109, the ends of which securely engage the coupled shafts and may be clamped to them as by the clamping rings 111, if desired.

The entire capstan assembly may be simply held in place against an upper table surface 112 of the transducer by means of the bracket 113, held as by the screws 115 to the table surface 112 and in turn holding the capstan motor as by means of the screws 117. The mounting bracket may also be provided with offset extensions 119 for securely engaging the flange 241 of the bearing member 93 and holding the bearing member in place in such a manner that it is self-aligning and requires no additional holding structures, such as matched accurately drilled screw holes in both the table 112 and flange 241.

The entire capstan assembly is shown as completely independent of expensive and accurately machined structures. The motor 203 provides its own bearing guides and is conveniently obtainable as a unit. The bearing 93 is self-aligning and can even be mounted slightly out of true with respect to the motor bearings, the flexible coupling 109 allowing for appreciable deviation. Likewise, the coupling ends of shafts 107 and 243 need not be accurately machined, the flexible coupling again accommodating inequalities of size or shape. Even the mounting bracket 113 need not hold the motor in any critically accurate alignment.

As a further simplification of construction, the flywheel 91 may be given dynamically balanced features by merely forming it of a plurality of sheet members 103, each formed by identical operations, as for example, by stamping or punching out of sheet metal, and securing the individual sheets in uniform rotationally displaced relationship. As shown, three sheets are used and held by three rivets 105, each sheet bearing an identically placed mark such as the notch 121 and assembled so that the notches are uniformly distributed around the periphery of the flywheel and the rivet holes are aligned. Due to the relatively high speed of the capstan shaft and flywheel, a much lighter flywheel can be used.

It can be readily appreciated that the novel capstan construction is a considerable improvement over the prior constructions which have been usually constructed with a roller provided with accurate bearing guides and a carefully balanced and extremely heavy flywheel and driven by means of an accurately finished friction drive having matched and non-interchangeable friction members. The only critical member of the novel construction is the capstan shaft 32 which can be very inexpensively produced in great lengths, a very short portion of which may be cut off and used in each capstan.

The specific shaft dimension used may be selected to provide the desired record track feed when actuated by any selected drive and because of the thinness the capstan shaft drives the tape through a very small radial arm or speed reduction so that its speed is not as easily affected by variation in drive loading. More uniform recordings result and the recordings are more freely interchangeable for uniform playback from different transducers.

Fig. 9 illustrates in a simplified diagrammatic manner the general relationship of the mechanical, magnetic and electric elements of a magnetic recording and reproducing apparatus exemplifying a different form of the invention. In general, it comprises a driving mechanism 2-10, a control mechanism 3-10 and a reeling mechanism 6-10 arranged to reel and guide a long flexible magnetic record member 31, such as a filament or wire stored on two reels 6-11, 6-12, along a path indicated by dash-double-dot lines, either in forward direction 3-32 during a recording or playback operation, or in the opposite rewinding direction for rewinding the recording medium on reel 6-11 before another recording or playback operation. A magnetic erasing head indicated at 33 and a magnetic record transducing head 34 are located along the path of the motion of the record member 31 for either recording magnetic signals on the magnetic recording medium by the operation of the erasing head 33 and the record transducing head 34 or for playing back recorded signals by the operation of the record transducing head 34 as a playback head, while the record member 31 is impelled in the forward direction 32.

To simplify the description of the features of the invention, a slow speed reeling operation in the forward direction of the arrow 32 will be designated as a normal forward reeling operation during which the record medium is reeled from reel 6-11 operating as a supply reel past the erasing head 33 and the transducing head 34 on to reel 6-12 which operates as a take-up reel, the two reels being for convenience designated as the supply and take-up reel although during a rewinding operation, take-up reel 6-12 operates as a supply reel and supply reel 6-11 operates as a take-up reel.

During the magnetic recording process, each element of the record member 31 passes successively first past the pole gap region of the magnetic erasing head 33 and then past the pole gap region of the record transducing head 34 operating as a recording head. The recording system shown in Fig. 9 is arranged to carry on magnetic recording and reproducing or playback operations under the control of a multiblade recording switch 4-41. The recording switch may be a standard multiblade switch which is shown operated manually by a knob from the neutral position shown either to the left for establishing the recording circuit connections or to the right side for establishing playback circuit connections.

When the recording switch 4-41 is in the left-hand recording position, its blades establish the following recording circuit connections: Contact blade 1 connects a source of high frequency oscillations 4-42 to a source of a positive power supply indicated by a plus (+) sign, the oscillation source 4-42 being shown connected to the coils of the erasing head 33 for supplying thereto high frequency erasing current of sufficiently large amplitude so that each longitudinal element of the moving magnetic record member 31 passing the gap region of the erasing head is subjected to an alternating flux strong enough to erase any previous magnetic signal records and restore the magnetic elements of the record member to a magnetically substantially-neutral condition. After being subjected to the magnetic erasing action by the erasing head 33, each element of the moving record member 31, upon reaching the pole gap region of the record transducing head 34, is subjected to a magnetic recording flux produced by the amplified signal currents which are to be recorded and a superimposed high frequency biasing flux component.

In Fig. 9, a conventionally shown microphone 4-43 serves as a source of signals which are to be recorded, and a loudspeaker 4-44 serves to reproduce the signals. During the recording operation, the microphone is connected by way of contact blade 2 in its left-hand position to the input side of a pre-amplifier 4-45, the output of which, after further amplification by an additional recording amplifier 4-45, is supplied to the coil windings of the record transducing head 34 through switch blade 3 of the recording switch 41 in its left-hand position, the circuits being completed through the ground connections shown.

The high frequency bias component of the recording flux is supplied by a high frequency current component derived from the oscillator 4-42 by a suitable circuit, such as shown, which includes an adjustable coupling condenser 4–47 for supplying an adjustable component of the high frequency oscillations to the output circuit of the amplifier 4–46 where it is mixed with the amplified signal currents supplied by the microphone 4–43 which are to be recorded. The coupling condenser 4–47 and the other circuit elements of the system are designed to mix a suitable component of the high frequency oscillations derived from the oscillator 4–42 with the amplified signal current supplied by the microphone in such manner as to produce in the gap region of the recording head 34 the desired combination of the signal recording flux and the superimposed high frequency biasing flux component.

To play back the signals magnetically recorded on the record member 31 while it moves in the same forward direction indicated by the arrow 32, the selector switch 4–41 is actuated to the right-hand playback position. In the right-hand reproducing or playback position of the recording switch 4–41, its blade 1 disconnects the positive supply source (+) from the oscillator 42 and the recording amplifier 4–46, thereby rendering them inoperative.

In addition, blade 2 of the selector switch 4–41, in its right-hand position, disconnects the input side of the preamplifier 4–45 from the microphone 4–43 and connects instead the windings of the record transducer head 34 to the input side of the amplifier 4–45, the output of which is now impressed on the additional playback amplifier 4–49, the output of which is supplied to the reproducer 4–44 by the switch blade 4 of the recording switch in its right-hand position, switch blade 3 now keeping open the circuit connection of the windings of the transducer head 34 to the recording amplifier 4–46.

The magnetizable record member may take various forms. It may be formed as a relatively thin wire on the order of .004 to .006 inch in diameter. It may, alternatively, take the form of a thin, narrow ribbon such as might be formed, for example, by flattening out such a thin wire. In other types of apparatus to which the principles of this invention are applicable, a relatively wide tape or sheet may be used as the record member. For example, the tape may be a quarter of an inch or more in width, although the apparatus shown herein is designed for a record member consisting of a long thin wire or wire-like tape. Such thin magnetic record member may also be formed of a filamentary element of a non-magnetic material, for example, a fibrous or plastic thread, in which is disposed a magnetizable powder material, or which is coated with a layer of magnetizable material.

For proper operation of the recording and of the reproducing actions, the speed of movement of the record member should be constant as it moves past the record transducing head, by means of which the signals are to be recorded or subsequently to be reproduced. After a desired signal has been recorded upon a magnetic record member, the record may be reproduced by moving the record member at the same speed past the same or a similar transducer head of the same characteristics, that is connected during such reproducing operation, to appropriate amplifying and reproducing circuits.

Normally, the filament or wire record member is disposed in wound condition on a supply spool or reel. During the recording operation, the wire is unwound from the supply spool or reel onto a receiving or take-up spool or reel. Movement of the wire from one spool to the other may be effected in various ways. Where the wire is drawn onto a receiving reel by driving that reel, a problem is introduced in maintaining the tension of the wire constant, due to the fact that the wire is wound onto the receiving reel at varying distances from the center or axis of the reel. For satisfactory recording and reproducing operations, the speed of the recording wire should be constant, as was stated above. In order to maintain the movement of the wire at such constant speed, particularly past the recording electromagnet, the magnetic record wire is wound around a sheave, and the sheave is rotated at a constant speed by a motor to pull the wire from one reel and supply it to the other reel. The speed of the wire is thus maintained constant in its movement from the supply reel onto the take-up or receiving reel.

As it moves from the supply reel to the take-up reel, the magnetic record wire is moved past the recording magnetic head in such manner that the wire constitutes a moving armature continuously in contact with two magnetic pole pieces of the head. Those pole pieces are magnetized according to the impressed signals, and a continuous record is thus made on the wire of the varying magnetic conditions of the recording magnetic head as the wire passes the magnetic head.

During the recording operation or during a subsequent reproducing operation, the speed of the wire is relatively slow—of the order of a foot per second. After a recording operation has been performed, and it is desired to rewind the wire back from the take-up reel onto the original supply reel so that the wire may be moved forward again for reproducing or for playback operation, it is not necessary to move the wire at such a slow speed. To reel the wire back, it is, in fact, desirable to move the wire at a relatively fast speed so that as little time as possible need be consumed in rewinding the recorded wire from the take-up reel back onto the supply reel. A high reeling speed is also desirable whenever a particular portion of the record member containing a desired record is required.

It is, therefore, desirable under different conditions to be able to wind the wire at a high speed in the forward direction, as well as at a high speed in the backward direction. For that purpose, a high-speed motor driven connection is provided for the driving sheave for a high-speed operation in forward or in backward direction.

In the recording mechanism shown, a separate motor is employed for reeling the recording member during the relatively slow recording and playback operations. A relatively slow driving force is derived from that motor by a speed-reducing and filtering system comprising a relatively large, rubber-tired idler coupling pulley through which the motor shaft imparts the desired constant slow speed to a capstan roller or sheave which drives the wire.

In order to perform a fast reeling operation, the wire-driving sheave is driven directly at high speed by another motor rotating at high speed in either direction. Suitable safeguards are also provided to prevent simultaneous application of driving forces to the wire-driving sheave from both motors.

For that purpose, both electrical and mechanical interlocking arrangements are provided. By an electrical interlocking arrangement, electrical driving energy is supplied to only one motor at a time. At the same time, the mechanical parts are controlled to prevent a mechanical driving connection between one motor and the sheave whenever the other motor is energized or coupled thereto.

When a magnetic record wire is wound onto the take-up reel or spool, or back onto the supply reel, it is desirable to control the winding of the wire onto either reel so it will tend to wind in layers instead of piling up all in one region on the reel that is the collecting or receiving reel for that operation.

To provide for such layer winding, or level winding, the two reels are mounted as part of a movable unit on a supporting shaft, and the unit is arranged to be reciprocated on the shaft as the spools rotate. The speed of reciprocation of the two reels as a unit is controlled to correspond generally to the winding speed of the record member wire so that the wire will be wound relatively level on the receiving reel. In this manner, any tendency for the convolutions of the wire to become entangled or overlaid, is avoided or reduced to a minimum. Any convenient form of level wind reciprocation may be used, those disclosed in the Arndt et al. application Serial No. 550,571, filed August 22, 1944, now Patent No. 2,535,478, issued on December 26, 1950, being very satisfactory.

In any operation where a filament or thread or, as in this case, a wire, is unwound from a supply spool and wound onto a receiving spool, the problem arises of maintaining substantially uniform tensioning of the filament or wire. If the tension of the magnetic wire is not maintained constant, some slippage might result between the wire and the driving sheave, with consequent result that either the record as electromagnetically recorded in the wire would not correspond to the original signals, or the playback of a properly-made record would not correspond to such record upon reproduction.

Constant tension in the wire is maintained by a differential drive unit mechanically connected between the two reels in such manner as to establish an automatically self-adjustable driving and reaction force between the two reels to control their relative speeds of rotation. Thus the tension of the wire is the same in the portion coming to the receiving reel as in the portion being at the moment released from the supply reel. Such differential mechanism automatically compensates for the difference in the speed between the layer being unwound from the supply reel and the layer being wound onto the receiving reel.

Another phase of the invention involves a novel limit-indicating and control device which indicates and operates when the end portion of the unreeling part of the wire on the unwinding or supply reel is being approached. That limit device operates to stop the reeling operation in sufficient time before the actual end of the reelable record member or wire is reached and before it is released by the reel from which it is unwound.

In the drive and reeling control shown, the intermediate or looped portion of the thin magnetic record medium 31 leading from supply reel 6-11 to take-up reel 6-12 is guided over one guide track 2-12 of a revolvably mounted capstan member 2-11 by way of a loop section 31-1 towards a revolvably mounted idler 2-19 and therefrom by way of loop section 31-2 on to another guide track 2-13 of the capstan 2-11 and therefrom to the take-up reel 6-12, in the manner indicated diagrammatically in Fig. 1. The two reels 6-11, 6-12 form part of a reeling mechanism arranged so that the two reels revolve around a shaft 6-13 extending in a direction transverse to the direction of the axis of the capstan 2-11.

In order to secure satisfactory operation of a magnetic recording and reproducing apparatus operating with a reelable, long thin record member, the reeling mechanism must be so designed as to assure that the record member is at all times maintained under correct and proper tension while in motion as well as at rest. Since the outer convolutions of the record member coils stored on the two reels 6-11, 6-12 must move at the same linear speed with which the tensioned intermediate cross loop is impelled past the record transducing heads 33, 34 and two reels on which the two record member coils revolve, will have the same angular speed only during the relatively short interval while the two record member coils have the same diameter, the two reels moving at different angular speeds under all other operating conditions and the reel with the record member coil of greater diameter revolving at a smaller angular speed than the reel with the coil of smaller diameter.

In the recording arrangement of the invention shown, the two reels 6-11, 6-12 form part of a reeling mechanism 6-10 so arranged that the axis of revolution of the two reels is in a direction substantially transverse or perpendicular to the general direction of a plane extending through the axis of revolution of the capstan 2-11, the capstan being arranged to be driven at a constant speed during a forward reeling operation in order to impel the record member 31 at a constant proper slow speed during a recording or playback operation.

The capstan or sheave 2-11 drives or impels the wire in a selected direction and is connected to and driven by a high-speed capstan motor 2-21 that is reversible so that the capstan 2-11 may be driven at high speed in either direction as selected by the operator of the apparatus. During forward reeling from supply reel 6-11 to take-up reel 6-12, motor 2-21 drives the capstan in clockwise direction as indicated by arrow F. The high speed in the forward direction is utilized, for example, during playback operation when it is desired to locate some particular portion of the wire that contains the desired recording. When the capstan motor 2-21 rotates in counterclockwise direction, it drives the capstan 2-11 at high speed to rewind the wire from the take-up reel 6-12 back on to the supply reel 6-11.

In order to drive the capstan 2-11 at the required constant slow speed in forward direction for impelling the record member past the heads 33, 34 at a constant slow speed during a recording or playback operation, there is provided an additional slow speed driven motor 2-41 having a shaft 2-42 which drives the capstan through a filter system including a revolvably-mounted, rubber-tired idler or coupling pulley 2-43 movable into and out of engagement with a flywheel 2-15 which is concentrically affixed and arranged to revolve with the capstan 2-11 and may form an integral part therewith. The idler pulley 2-43 is revolvably mounted at 2-46 on a slider plate 2-47, one arm of which is biased as by a spring 2-48 so as to bring the coupling idler 2-43 from the full-line coupling position shown to the dash-line uncoupling position 2-43-U during a slow forward reeling operation during which the shaft of the slow speed drive motor 2-41 imparts through coupling pulley 2-43 and flywheel 2-15 the desired constant low speed rotation for impelling the recording medium in forward direction during the recording or playback operation. The capstan 2-11 with its flywheel 2-15, the guide idler 2-19 and the two motors 2-21, 2-41 are all revolvably mounted on suitable elements or members of a frame structure of the recording apparatus.

The slider plate 2-47 of the coupling pulley 2-43 is mounted for sliding movement along suitable supporting elements of the frame structure. As indicated, one arm of the slider plate is provided with a guide slot 2-49 slidably engaging a retaining member 2-51 in the form of a shoulder screw or post suitably affixed to the frame structure so as to confine and guide the movement of the coupling pulley 2-43 between its full-line coupling position shown and the dash-line uncoupling position 2-43-U in which it couples the shaft of the slow speed drive motor 2-41 to the fly-wheel 2-15 of the capstan 2-11 for driving it at the proper low constant speed during a slow forward reeling operation.

The various drive and coupling operations are controlled by the control mechanism generally indicated at 3-10. In the form shown, it comprises a plurality of control members 3-11, 3-12 shown in the form of button-operated push rods. The control members 3-11, 3-12 form part of a mechanism generally similar to a conventional push-button rod control mechanism in which a plurality of button-operated control push rods are arranged to be retained and latched in an inward operated position by a spring or otherwise biased latch bar, a latched control push rod being released from the latched condition whenever any other push rod is actuated to the inward position. Such conventional push-rod control mechanisms are also frequently provided with a release push rod which cannot be latched and is at all times biased to an outward released position, but which serves to release any of the operated latched push rods whenever the released push rod is momentarily actuated to an inward releasing position.

In the control mechanism shown, the two control members 3-11, 3-12 have the form of push rods slidably held and guided in guide walls 3-13 of a mounting structure, each of the push rods being shown provided with suitable biasing means, such as an encircling compression spring 3-14 arranged so as to bias and tend to return its associated push rod to an outward position whenever the push rod has been actuated to an inward position against the opposing biasing forces of its biasing means 3-14. The two push rods 3-11, 3-12 are provided along their inward regions with cam surfaces 3-15, 3-16, respectively, extending through slits 3-17, 3-18 of a latch bar 3-19 slidably mounted in mounting wall portions 3-21 of the mounting structure and biased by biasing means, such as a spring 3-22 for sliding movement in lateral direction so as to retain the push rod 3-11 in an inward latched position when it is pushed in inward direction until the shoulder portion 3-23 of its cam surface passes through its latch bar slit 3-17.

The inclined cam surface 3-15 of the push rod 3-11 is so shaped and its biasing spring 3-14 is so designed in relation to the biasing spring 3-22 of the latch bar 3-19 that—with the push rod 3-11 held in its inward position by latching engagement of its cam shoulder 3-23 with the edge of the latch bar slit 3-17—the latch bar 3-19 is actuated against the action of its biasing spring 3-22 slightly to the right to permit the inclined surface portion 3-15 of the push rod 3-11 to enter the latch bar slit 3-17. The biasing action of the biasing spring 3-14 of the push rod will return the push rod 3-11 to its outward position while its inclined cam surface 3-15 will actuate the latch bar 3-18 to the full-line released position shown.

The other push rod 3-12 of the control mechanism 3-10 has a cam 3-16 so shaped that when it is pushed inwardly the engagement of the cam surface 3-16 with the slot 3-18 of the latch bar will actuate the latch bar to the right and assure that whenever the push rod 3-12 has been actuated to the inward position the "Start-on" push rod 3-11 is instantaneously released from an inward latched position and permitted to return to the outward released full-line position in which it is shown. The cam surface 3-16 of the stop push rod 3-12 is so shaped that it can never be pushed to an inward position in which it could be latched by the latch bar 3-19.

In the arrangement shown, the "Start-on" push rod serves to control the operation of a motor-energizing switch 3-25 and a control lever 3-26 shown pivotally mounted at 3-27 whenever the "Start-on" push rod is actuated from the released outward position shown to an inward operated position in which it is latched by the latch bar 3-19. The switch 3-25 and the control lever 3-26 are shown operated by suitable prongs of the push rod 3-11 and they may be mounted in a conventional way on the substantially rigid mounting structure of the button-operated push rod mechanism.

The push rod control mechanism described above serves to start and to stop all reeling operations whether a slow forward reeling operation or a fast forward or a fast rewind operation, an additional selector mechanism being utilized to selectively set or select the character of the reeling operation.

In the form shown, the selector mechanism, generally designated 3-30, comprises a rotatably mounted shaft 3-31 which is operated by a selector knob 3-32 to one of three different angular operating positions, namely, to positions indicated by the legends FF for fast forward reeling, RP for slow forward reeling during a recording or playback operation, and RW for fast rewind. In the arrangement shown, the selector shaft 3-31 is utilized to operate a three-position switch 3-34 to one of three contact positions corresponding to the three selector positions FF, RP, RW. When the selector knob is in the FF position, the movable contact blade of switch 3-34 connects lead 2-P of the power supply line to one of the three terminals of the fast reeling motor 2-21 so as to prepare an energizing circuit for this motor for causing it to rotate the capstan 2-11 at a high speed in a clockwise forward direction F during a fast forward reeling operation, the energizing circuit to this fast reeling motor 2-21 being completed only when the additional motor energizing switch 3-25 completes the common circuit connection of this motor to the lead 1-P from the power supply terminal of opposite polarity.

When the selector shaft is in position RW, its selector switch 3-34 connects in a similar manner another terminal of the fast reeling motor 2-21 to the power supply lead 2-P for energizing the motor to drive the capstan at a fast speed in counterclockwise direction and performing a fast rewinding operation.

When the selector shaft 3-31 is set in position RP, the selector switch 3-34 connects the power supply lead 2-P to the slow reeling speed motor 2-41 for energizing this motor to drive through coupling pulley 2-43 the fly wheel and capstan 2-11 at a required constant low speed in forward direction during a recording or playback operation.

The selector shaft 3-31 is also shown utilized to operate a rotary cam member 3-35 arranged to be turned to three different positions corresponding to the three different settings FF, RP, RW of the selector knob. In the arrangement shown, the selector cam 3-35 is utilized to selectively control the position of the coupling pulley 2-43 and cause it to move and be retained either in the full-line coupling position shown or in the dash-line uncoupling position 2-43-U depending on the position of the selector shaft and its knob 3-32.

In the arrangement shown, the selector cam member 3-35 is provided with a generally circular cam surface having a cut-off surface portion 3-36 and designed for cooperation with a facing portion of a coupling lever 3-37 shown pivotally mounted at 3-38 on a fixed element of the frame structure and pivotally connected at 3-39 with the slider plate 2-47 of the coupling pulley 2-43 and arranged so as to selectively actuate to and retain the coupling pulley 2-43 either in the full-line coupled position shown or in the dash-line uncoupling position depending on the setting of the selector cam 3-35.

In the arrangement shown diagrammatically in Fig. 9, this is accomplished by shaping and arranging the cam surface portions of the selector member 3-35 and the cooperating elements of the coupling lever 3-37 and the other elements of the coupling mechanism so that when the selector shaft 3-31 with its knob is in the RP, slow forwarding setting, the cut-off cam section 3-36 of the selector cam 3-35 permits the coupling lever 3-37 to pivot around its pivot 3-38 in upward direction as seen in the figure thereby permitting the biasing spring 2-42 of the slider member 2-47 to bring and retain the coupling pulley 2-43 in the full-line coupling position in which the slow speed reeling motor 2-41 will drive the flywheel 2-15 and the capstan 2-11 at the proper low constant speed during a forward recording or playback operation; and that upon turning the selector cam 3-35 from the slow reeling RP position shown, either to the fast forward FF or fast rewind RW position, one or the other of the cam surface portions of the cam member 3-35 bordering its cut-off cam portion 3-36, will engage the cooperating portion of the coupling lever 3-37 and turn it around its pivot 3-38 for bringing the slider member 2-47 and the coupling pulley 2-43 from the coupling position shown to the dash-line uncoupling position 2-43-U and retain it therein, and thus break the slow speed driving connection to the capstan as long as the selector cam is either in the FF fast forward or in the RW fast rewind settings.

In the arrangement shown, the selector cam member 3-35 is also utilized to lock the selector mechanism and the elements operating or controlled thereby in either one of its different operating positions as long as the reeling mechanism is in motion and thus prevent damage, such as breaking and entanglement of the wire or any other injury to the reeling mechanism by inadvertent reversal of a reeling operation before first bringing all the critical elements of the mechanism to a stop.

In the arrangement shown, the selector member 3-35 is, to this end, provided with three locking recesses 3-FF, 3-RP, 3-RW corresponding to the three settings of the selector switch and arranged for interlocking engagement with a locking projection or lug 3-28 of the latch bar 3-19, in such manner that whenever the starting push button 3-11 is actuated to an inward operated position, thereby releasing the latch bar 3-19 to a leftward latching position to which it is biased by the spring 3-22, the locking projection 3-28 will enter one or the other of the three cam recesses 3-FF, 3-RP, 3-RW and lock the cam member with the selector mechanism in a given angular setting position as long as the start push rod is in the inward operated position and the latch bar 3-19 is held in its leftward locking position by its biasing spring 3-22.

With a reeling mechanism of the type described above, it is important to assure that a reversal of a reeling operation is rendered impossible before first bringing the moving elements of the reeling mechanism to a stop. Thus, it might be possible for an operator—after first actuating the stop rod 3-12 and releasing the "Start-on" rod 3-11 to the non-operated position, and thereby returning the latch bar 3-19 to the right-hand non-latching position in which it is shown—to turn the selector knob and the selector cam 3-35 from the fast rewind setting RW to a slow forward setting RP, for instance, and immediately actuate the "Start-on" rod 3-11 to the inward starting position before the rotating elements of the mechanism which were rotating at a high speed were brought to a dead stop. Accordingly, provisions have to be made to prevent a premature reversal of the reeling operation which would result in the breakage of the wire before the rotating elements of the mechanism have been first brought to a dead stop.

In the reeling mechanism of the type shown in Fig. 9, no excessive strain would be imposed on the filamentary record member 31 if a slow reeling operation in forward direction were started before first bringing the capstan to an actual stop. However, if a slow forward operation were started following a fast rewind operation in counterclockwise direction before bringing the capstan and the other rotating elements of the mechanism to a stop, the filamentary recording medium might be subjected to a strain sufficient to cause it to break.

The reeling mechanism is shown as combined with means operated by a moving or revolving member of the reeling mechanism for exerting a preventive action preventing a reversal of the direction of the reeling operation as long as one of the moving elements of the reeling mechanism participating in or controlling the reversal of the direction of the reeling motion has been first brought to a stop. In the arrangement shown, the capstan 2-11 with its flywheel 2-15 which is utilized to impart to the recording member 31 a reeling motion in forward direction or in rewinding direction is utilized as the revolving member for operating a locking element which is operative to prevent a reversal of the direction of the reeling motion before it was first brought to a stop.

In the recording arrangement shown, the locking element is formed by a latch rod or bar 3-41 which is suitably guided in guide openings of guide elements 3-42 so as to be movable between the retracted or unlocking position shown and the outward dotted-line position 3-41-L in which it is interposed on the path of a locking lug 3-44 extending from the coupling lever 3-37 so as to lock the coupling lever 3-37 in the dash-line uncoupling position 3-37-U and thus prevent the coupling lever 3-37 from bringing the coupling pulley 2-43 from the coupling position to the uncoupling position, as long as the latch rod 3-41 is interposed in the path of the motion of the locking lug 3-44 of the coupling lever. One or more generally analogous locking members may be combined with the elements of a reversible reeling mechanism of a magnetic recording apparatus and arranged so that when reversing a reeling operation, the locking member is actuated by the associated revolving element to lock an element of the reversing mechanism and hold it locked until the reeling mechanism is first brought to a stop.

In the recording arrangement shown in Fig. 9, the locking bar 3-31 is shown connected through a link 3-45 to a brake shoe 3-46 having a brake pad arranged to be held by a brake arm 3-47 against the periphery of the capstan flywheel 2-15 whenever the capstan with its flywheel, while rotating in counterclockwise direction, is brought to a stop, so that the frictional engagement between the flywheel which is moving in counterclockwise direction and the brake pad of the brake shoe 3-46 causes it and there through the lock bar 3-41 to be moved from the retracted position shown to the latching position against the biasing action of biasing means indicated by a spring 3-48 tending to return the lock bar 3-41 to the retracted full-line position.

As indicated, the brake lever 3-47 is shown pivotally mounted at 3-51 and biased by a spring 3-52 to press the brake shoe toward the periphery of the flywheel. The brake shoe 3-46 is arranged to be slidably movable along an opening 3-53 of the brake lever, being retained therein by suitable means, such as a shoulder screw or post 3-54 and arranged so that whenever the brake lever 3-47 holds the brake shoe 3-46 in frictional engagement with the flywheel 2-15, the frictional forces imparted by the flywheel rotating in counterclockwise direction will move the brake shoe 2-46 along its guide slot 3-53 in a direction which causes it to actuate the locking bar 3-41 from the retracted position shown to the dash-line locking position 3-41-L against the biasing forces of the retracting spring 3-48.

An additional brake shoe may be provided and arranged to operate another lock bar through a similar linkage whenever the capstan with the flywheel 2-15, while rotating in clockwise direction, is brought to a stop for actuating the brake shoe to impose a similar lock bar in the path of the motion of a similar locking element of the coupling mechanism to prevent a change in the drive coupling connection, or, in general, in the mechanical connections of the driving mechanism incident to the reversal of the driving motion before the capstan with the flywheel, or, in general, the impelling element which impels the record member 31, has been first brought to a stop. However, in the particular recording arrangement shown, it is sufficient to provide only a safeguard against reversal of the driving operation of the type described and shown only under conditions when the capstan with the flywheel rotates at a high speed during a rewinding operation.

In the arrangement shown in Fig. 9, means are also provided to automatically remove from the reeling and driving mechanism all braking forces whenever the normal slow or normal fast forward or rewind operation is performed and to supply the braking forces to quickly stop the reeling operation only when the reeling mechanism is actuated to stop while in motion. In the arrangement shown, this is accomplished by connecting the brake lever 3-47 through a link 3-56 to one arm of the lever 3-26 which is operated by the "Start-on" control rod 3-11 in such manner that each time the "Start-on" rod is actuated to the operative position for starting a reeling motion, the brake shoe 3-46 is removed from its braking engagement with the flywheel, and that upon releasing the "Start-on" control rod 3-11 by the operation of the stop rod 3-12, the biasing spring means 3-52 of the brake arm instantaneously returns the brake shoe into braking engagement with the flywheel for stopping the motion of the capstan.

It should be pointed out in this connection that the main motor-energizing switch 3-25—which is likewise actuated to the operated closed position when the "Start-on" push rod 3-11 is actuated to the inward operated position—is so arranged that when the "Start-on" push rod is actuated to the inward operated position, it first removes the braking action of the brake shoe before closing the main motor-energizing switch 3-25, and that on releasing the "Start-on" push rod, it first opens the motor-energizing switch 3-25 before the brake shoe 3-46 comes into engagement with the flywheel 2-15 for stopping the rotation of the capstan 2-11.

When the "Start-on" push rod is actuated to the inward operated position with the selector mechanism set in the slow forward reeling position RP, the "Start-on" push rod 3-11 will actuate its control lever 3-26 to remove the braking action from the capstan flywheel 2-15 and actuate its switch 3-25 to complete the energizing circuit for the slow forward drive motor 2-41 and this motor will drive through the retractible coupling pulley 2-43 and the flywheel 2-15 the capstan at the required low speed in the forward direction F for carrying on either a recording or playback operation depending on the setting of the recording playback switch 41.

When the "Start-on" push rod 3-11 is actuated to the inward operated position while the selector mechanism is set by selector knob 3-32 in the fast rewind position RW, the operated "Start-on" push rod 3-11 will actuate its switch 3-25 to energize the fast reeling motor 2-21 to drive the capstan at a high speed in a direction opposite to the direction of the arrow F for rewinding the recording medium at a fast rate on the supply reel 6-11.

When the "Start-on" push rod 3-11 is actuated to the inward operated position while the selector mechanism is set by knob 3-32 in the fast forward position FF, the operated push rod 3-11 will actuate its switch 3-25 to complete the other energizing circuit of the fast reeling motor 2-21 for driving the capstan 2-11 at a high speed in the forward direction of the arrow F for enabling the user to locate quickly a desired portion of the great length of the recording medium stored in spirally-wound form on the two reels 6-11, 6-12.

Each time the "Start-on" push rod 3-11 is actuated to the operated position, it will remove the brake 3-46 from its braking engagement with the flywheel 2-15 of the capstan 2-11. However, any of these reeling operations may be instantaneously stopped by momentary actuation of the "Stop" push rod 3-12, thereby releasing the "Start-on" push rod from the inward operated position to the released position, in which it is shown, whereupon the energized motor is cut off from the energy supply by the opening of switch 3-25 and the brake 3-46 is released into braking engagement with the flywheel of capstan 3-11, thereby bringing it quickly and substantially instantaneously to a stop.

In addition, a reversal of a reeling operation from fast-rewind to a slow-forward, or a fast-forward reeling operation is subjected to the special interlocking action which prevents the effecting of such reversal of the reeling operation before first bringing the revolving elements of the mechanism to a stop.

In the recording arrangement shown, the supply reel 6-11, portions of which are shown in detail in Figs. 10, 11 and 12, as well as portions of the take-up reel 6-12, each formed by a channel-like structure having a generally cylindrical inner channel wall 6-14 and two channel side walls 6-15, 6-16 confining the reel channel space 6-17 within which successive layers of spirally-wound convolutions of a record member, such as the thin wire 31, are stored.

In order to provide the desired automatic stopping means which trip the reeling mechanism and bring it to a stop before the end of the record member stored on the reel is reached, each reel is provided with a trip arm 6-21 pivotally mounted at 6-22 and arranged to be biased so as to tend to bring a retainer projection 6-23 of the trip arm 6-21 through a window or opening 6-25 of the reel channel structure into a portion of the reel channel space which is uncovered when, in the course of a reeling operation, the end region of the coil convolutions of the record member is reached.

The trip arm with its retainer finger 6-23 and its pivot are so arranged relatively to the channel structure of each reel, that when the portion of the reel channel wall 6-14 along which the inner layer of the record member convolutions is removed, thereby releasing the retainer finger 6-23 into the reel channel space 6-17 and permitting the trip arm 6-21 to move outwardly beyond the periphery of the reel end wall 6-15 into the path of a stop member 6-31 movably mounted on the frame structure of the apparatus which is hit by the outwardly projecting trip arm 6-21 of the reel and is actuated to cause it to impart to the latch bar 3-19 of the control mechanism an unlatching movement of the same character as imparted thereto by the inward actuation of the stop rod 3-12 so as to cause the "Start-on" push rod 3-11 to be instantaneously released from an operated position to a released position in which the motion of the reeling mechanism is substantially instantaneously stopped.

As shown in Figs. 10, 11 and 12 each of the reels 6-11, 6-12 has mounted on the exterior of its inner side wall 6-15 a trip finger 6-21 which is pivotally held by a pivot pin 6-22 on a portion of the revolving support structure, so that it may rotate on its pivot from the inward full-line position shown in Fig. 12—in which it is confined within the periphery of the reel—to the outward dash-line trip position 6-21-T, in which a trip or strike edge 6-26 thereof projects beyond the periphery of the reel. The trip finger 6-21 is biased, as by a spring 6-28 or by centrifugal force or both, so as to urge a finger projection 6-23 thereof through a window opening 6-25 of the reel channel structure into a portion of the reel channel space 6-17, when the last convolution of the filamentary recording medium covering the window 6-25 is unwound from the inner channel wall 6-14 of the reel. The trip finger 6-21 is mounted on the exterior side of the inner channel wall 6-15, and it is so shaped that— when toward the end of a reeling operation the unwinding of the last layer of the filament convolutions from over the reel window 6-25 of the reel—the outward biasing forces move the trip finger from the retracted full-line position in which it is shown in Fig. 12 to the outward dash-line trip position 6-21-T, so that its forward striking edge 6-26 which rotates with the reel will strike a catch projection 6-31 of a trip rod member 6-32. The trip rod 6-32 is rotatably mounted on a fixed support, and is suitably connected as by an arm 6-33 to the latch bar 3-19 of the control mechanism, so that each time the catch projection 6-31 of the rod 32 is struck by the striking edge 6-26 of the reel trip finger 6-21, the arm 6-33 will actuate the latch bar 3-19 to the unlatching position in which it releases the stop-on dash arm position rod 3-11 from the inward operating position to the outward release position, thereby stopping the reeling operation.

As shown in Figs. 10 and 11 the reel is of such height that an end portion of the inner convolution layer on the inner reel channel wall will remain anchored thereon, after the window 6-25 is uncovered to set off the trip operation which stops the reeling operation.

In the arrangements shown, the trip finger 6-21 of the supply reel 6-11 is so associated therewith, that it will trip the reeling operation only when the recording medium 31 is reeled from supply reel 6-11 on to the take-up reel 6-12. The trip finger of the supply reel striking the trip rod 6-31 is accordingly effective for tripping only when this reel rotates in clockwise direction as seen from the top of Fig. 9.

When the trip finger 6-21 is in the retracted position, in which it is shown in full lines for the supply reel 6-11 in Figs. 10 and 11, its outer periphery 6-27 is substantially confined within the periphery of the side wall 6-15 of the reel. However, should the supply reel, with the trip finger 6-21 released to the outward dash-line trip position 6-21-T, rotate in opposite direction during a rewinding operation the inclined outer edge surface 6-27 of the projecting trip projection finger 6-21 will not actuate the trip rod 6-32 because the inclination of the outer edge surface 6-27 of the trip finger is such that it will be deflected by the catch projection 6-31 from the outward to the inward position overcoming the biasing forces.

In an analogous manner, a similar trip finger 6-21 is provided on the exterior of the inner face of the take-up reel 6-12 to automatically trip a reeling operation at the end of a rewinding operation, but to cause its outwardly projecting tripping finger 6-21 to be deflected to its inward position by the catch projection 6-31, should the take-up reel be rotated in counter-clockwise direction looking down from above during the forward reeling operation, when the record member 31 is reeled thereon.

In the diagrammatic view of Fig. 9, the catch projection 6-31 of the trip rod 6-32 is shown held through its arm connection 6-33 with the latch bar 3-19 in the tripped position. The cocked position of the catch projection indicated by the dash line 6-31C, is the position the catch projection is turned to when the "Start-on" push rod is operated to the inward position to start a reeling operation, thereby actuating the latch bar 3-19 to its left-hand position and causing it to turn the trip rod 6-32 with its catch projection 6-31 to the cocked position. Releasing the "Start-on" rod causes it to move the latch bar 3-19 to its right-hand position, thereby automatically actuating the trip rod 6-32 with its catch position 6-31 from its cocked position to the uncocked position in which it is shown in full lines. With this arrangement, actuation of the control mechanism to the start on condition automatically brings the automotive tripping elements 6-31, 6-32 of the control mechanism to the full line cocked position; and upon releasing the control mechanism to the release stop position, its trip elements 6-31, 6-32 are automatically returned to the uncocked position.

In accordance with the invention, the limit levers, such as 267 or 367, may be arranged for slidable instead of pivoted operation or for slidable and pivoted operation. For example, the limit lever 367 may be held as by guides on the collar 363 so as to permit outward sliding as by a bias such as the centrifugal force developed during reel rotation. The sensing end 366 will be retained by the record track on the reel until it is unwound when the outer end of member 367 is arranged to engage and actuate a trip member such as member 288 or 6-31. No lip such as lip 381 need be provided with such construction. The non-reversible operating features of the tapered lip face may be incorporated by suitably tapering the projecting outer end of the limit member 367.

The phrase "transducing magnetic records" as used herein in the application and claims is intended to mean either a magnetic recording operation, or reproduction of a magnetic record, or the erasing of a magnetic record made on a magnetic recording medium, or in combination of one or more such operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a magnetic record transducing apparatus for transducing magnetic records on an elongated permanently magnetizable record track moving along a guide path in magnetic linkage with a magnetic transducing head, the combination of: a support; at least one generally reel-like track holder having storing space into which the record track may be wound and stored as a succession of coil turns and from which it may be unwound for movement along the guide path; means revolvably mounting said track holder on said support; power means including control elements for controllably establishing power connections to said track holder which cause said track to be impelled to unwind from the track holder; said control elements including a trip member mounted on said track holder and movable between an outward position in which it is held by a sensing portion of the trip member in engagement with a portion of the record track positioned within the storing space of said holder, and an inward position in which said sensing portion enters the portion of the storing space freed from a portion of the record track during unwinding of said record track from said holder; and a limit member mounted on said support and movable from a non-trip position to a trip position in which it actuates said power means to open said power connections; said trip member having a trip projection which engages and trips said limit member to its trip position when said trip member is released to its inward position while said holder revolves in a track unwinding sense, and said trip projection having an actuating surface shaped to be engaged by said limit member and actuated thereby to deflect said trip projection away from said limit member toward the outward position of the trip member when said holder revolves in a track-winding sense.

2. In a magnetic record transducing apparatus for recording, erasing or reproducing signals on an elongated permanently magnetizable record track moving along a guide path in magnetic linkage with a magnetic transducing head, the combination of: a support; a pair of record track holders each having an outwardly opening track storing space bounded by at least one side wall and an adjoining floor, and into which the record track may be wound and stored in coiled form and from which it may be unwound for movement along the guide path; means revolvably mounting said pair of track holders on said support; control elements for controlling power connections to selectively effect record-transducing operations and record track impelling operations including impelling the record track in opposite directions; at least one of said holders including as a control element a trip member mounted on said holder and movable between an outward position in which it is held by a sensing portion of the trip member in engagement with a portion of the record track positioned within the storing space of said holder, and an inward position in which said sensing portion enters the portion of the storing space freed from a portion of the record track during unwinding of said record track from said holder, said control elements including limit switch means having a switch actuating member mounted on said support and movable from a non-trip position to a trip position in which it actuates said limit switch to effect opening of said power connection; said trip member having a trip projection which engages and trips said switch actuating member to its trip position when said trip member is released to its inward position while said holder revolves in a track unwinding sense, and said trip projection having an actuating surface shaped to be engaged by said switch actuating member and actuated thereby to deflect said trip projection away from said switch actuating member toward the outward position of the trip member when said holder revolves in a track-winding sense.

3. In a magnetic record transducing apparatus for recording, erasing or reproducing signals on an elongated permanently magnetizable record track moving along a guide path in magnetic linkage with a magnetic transducing head, the combination of: a support; at least one revolvable record track holder having an outwardly opening track storing space bounded by at least one side wall and an adjoining floor, and into which the record track may be wound and stored in coiled form and from which it may be unwound for movement along the guide path; power energizable revolvably mounted retaining elements for detachably retaining at least one of said track holders in a revolvable position in which said track may be wound or unwound therefrom while said means is energized to revolve; control elements for controlling power connections to selectively effect record-transducing operations and record track impelling operations including reeling in opposite directions; at least one of said holders including as a control element a trip member mounted on said holder and movable between an outward position in which it is held by a sensing portion of the trip member in engagement with a portion of the record track positioned within the storing space of said holder, and an inward position in which said sensing portion enters the portion of the storing space freed from a portion of the record track during unwinding of said record track from said holder, said control elements including limit switch means having a switch actuating member mounted on said support and movable from a non-trip position to a trip position in which it actuates said limit switch to effect opening of said power connection, said trip member having a trip projection which engages and trips said switch actuating member to its trip position when said trip member is released to its inward position while said holder revolves in a track unwinding sense, and said trip projection having an actuating surface shaped to be engaged by said switch actuating member and actuated thereby to deflect said trip projection away from said switch actuating member toward the outward position of the trip member when said holder revolves in a track-winding sense.

4. A magnetic transducer device for transducing records on an elongated magnetizable tape comprising: a support; a pair of reels revolvably mounted on said support for reeling said tape from one to the other, each said reel having a flange with a slot therethrough; a motor for driving said reels in forward and rewind directions; electrical circuit means connected to said motor for energizing said motor and including a switch for breaking said electrical circuit to de-energize said motor; a trip member having a trip projection and a sensing portion; means mounting said trip member adjacent one of said reels for rotary motion together with the reel and for motion with respect to said reel between an outward position with the sensing portion located in said slot against the edges of the tape wound on said reel, and an inward position with the sensing portion extending through said slot into the location vacated by said tape as said tape is unwound from said reel; a limit member mounted on said support near said reel for movement from a first position to a second position during which it actuates said switch; said trip member upon moving to its inward position during rotation engaging said limit member to move said limit member from said first to said second position.

ALFRED L. W. WILLIAMS.

References Cited in the file of this patent

UNITED STATES PATENTS

| Number | Name | Date |
|---|---|---|
| 947,148 | Browne | Jan. 18, 1910 |
| 1,108,501 | Kirchhoff | Aug. 25, 1914 |
| 1,366,182 | Hokanson | Jan. 18, 1921 |
| 1,560,721 | O'Reilly | Nov. 10, 1925 |
| 1,642,631 | Kaplan | Sept. 20, 1927 |
| 1,814,706 | Karrer | July 14, 1931 |

FOREIGN PATENTS

| Number | Country | Date |
|---|---|---|
| 852,767 | France | Nov. 9, 1939 |